March 15, 1966     B. C. HOLBEN     3,240,319
TRANSFER MECHANISM FOR AUTOMATIC ROUTING CONVEYORS
Original Filed April 20, 1961
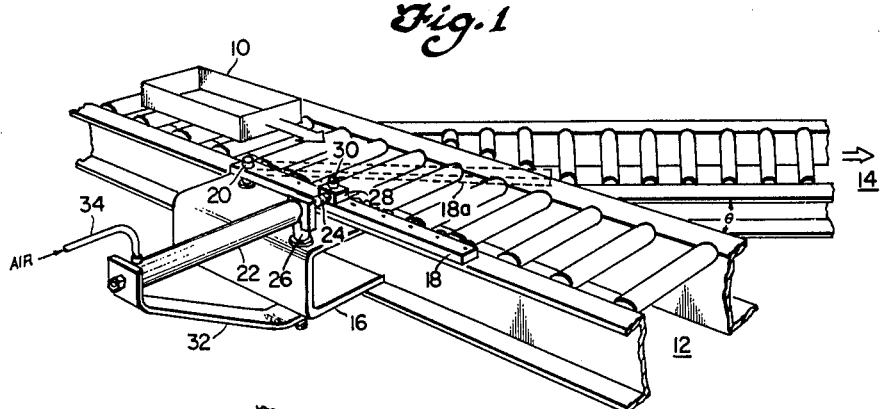
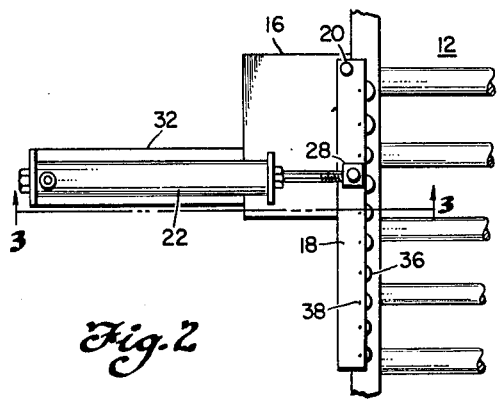
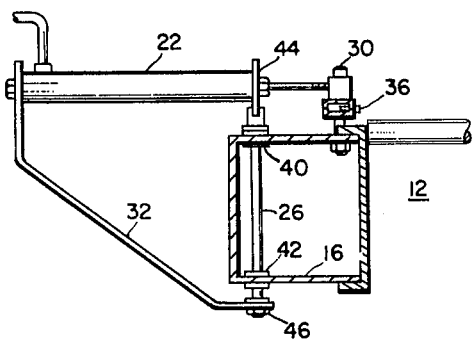
INVENTOR
Bernard C. Holben
By Charles M. Hutchins
HIS ATTORNEY

United States Patent Office 3,240,319
Patented Mar. 15, 1966

3,240,319
TRANSFER MECHANISM FOR AUTOMATIC
ROUTING CONVEYORS
Bernard C. Holben, Dublin, Ohio, assignor to Industrial
Nucleonics Corporation, a corporation of Ohio
Original application Apr. 20, 1961, Ser. No. 104,455, now
Patent No. 3,126,086, dated Mar. 24, 1964. Divided
and this application Dec. 26, 1963, Ser. No. 333,571
2 Claims. (Cl. 198—185)

This is a division of my copending application Serial No. 104,455, filed April 20, 1961, now Patent No. 3,126,086, and the disclosure thereof is incorporated by reference herein.

This invention relates generally to conveyor systems and more specifically to improved apparatus for diverting and transferring articles from one conveyor to another.

In conveyor systems, articles traveling on a main conveyor line must frequently be routed onto other intersecting branch conveyors for purposes of sorting or storage. It may be desired to either divert the articles whereby their direction of travel is altered or to transfer articles from one conveyor to another traveling in the same direction. Whatever the operation the actuating member must be positive-acting. Reliability is essential to the successful operation of conveyor systems handling large volumes of traffic. Recently, the trend has been to higher conveyor line speeds approaching 120 feet per minute and a traffic volume approaching thirty or thirty-five units per minute. Slow-acting prior art devices have failed to cope with these high conveyor speeds especially where the traffic density is greater than fifteen units per minute.

The present invention provides an improved material transfer station comprising a pneumatically-operated diverter bar carrying a plurality of aligned roller bearings. The arm is pivoted at one end and pivotally connected at a point intermediate the ends thereof to a piston-and-cylinder driving mechanism. The arm is movable from a first position out of the path of trays traveling on the main conveyor to a second position wherein the roller bearings define an alternate path for the tray with the intersecting branch conveyor.

Accordingly, it is a primary object of the present invention to provide an improved material transfer station for rapid conveyor systems.

It is another object of the present invention to provide a material transfer station that is quick and reliable in operation.

It is still another object of the present invention to provide a material transfer station that is readily adaptable to existing conveyor systems.

It is yet another object of the present invention to provide a material transfer station that is simpler to construct and more economical to maintain in operating condition than similar devices used heretofore.

These and other objects and advantages of the present invention will become more apparent from the following description when taken in conjunction with the present invention:

FIG. 1 is a perspective view of a portion of a conveyor system showing a material transfer station constructed in accordance with the present invention;

FIG. 2 is a partial top plan view of the transfer station shown in FIG. 1; and,

FIG. 3 is a sectional view taken on the line 3—3 of FIG. 2.

Referring to the drawings and specifically to FIG. 1, a main conveyor 12 is adjoined by a branch conveyor 14 intersecting at some angle θ. At the intersection is provided a U-shaped mounting bracket 16 welded to one side of the main conveyor 12. A diverter bar 18 is pivotally mounted at one end by a pin 20 extending downwardly through the mounting bracket 16 and secured thereto.

An air cylinder 22 and piston rod 24 provide the driving force required to move the diverter bar 18 into the dotted line position 18a. One end of the cylinder is pivotally mounted on the bracket 16 by a pin 26 to accommodate the rotary movement of the bar 18. The piston rod 24 is threaded at one end to receive a block 28. The block is fastened onto the diverter bar 18 by a capscrew 30. The air cylinder is secured at the other end by a bracket 32 which also pivots about the pin 26 as hereinafter explained. A conduit 34 admits air under pressure to the interior of the cylinder 22 thereby producing an outward thrust on the bar 18.

The construction of the bar 18 carries a plurality of roller bearings 36 in horizontal alignment. A vertical pin 38 rotatably mounts each roller bearing 36 to the bar 18. In this manner, when the bar 18 is swung out, the thrust of the piston is exerted over a substantially large area distributed over the length of a tray 10. Moreover, the force is exerted against the side of the tray in the desired direction of travel.

As the bar 18 is forced outward, the longitudinal axis of the cylinder 22 can no longer remain perpendicular to the conveyor 12. Referring to FIG. 3, means for pivoting the cylinder assembly for rotation is shown. The pivot pin 26 extends through bearings 40, 42 provided in the mounting bracket 16. The pin 26 is slotted to receive a cylinder mounting bracket 44 which may be welded. Pin 26 is provided with a shouldered upper and lower end portions. The lower portion is threaded to receive the cylinder supporting bracket 32 and a retaining nut 46.

While the present invention has been described in terms of specific apparatus, this construction should be in no way interpreted as limiting the invention. Inasmuch as numerous additions, omissions and substitutions may be made to the illustrated embodiments without detracting from the original spirit or scope of the invention, the only restrictions are those clearly imposed by the following claims.

I claim:
1. Article diverting apparatus comprising:
a main conveyor for conveying said article in one direction,
a side conveyor joining said main conveyor and extending therefrom to define a alternate path for said article,
a straight diverter bar positioned above said main conveyor across from said side conveyor,
means for pivotally mounting one end of said bar on the outside of said main conveyor,
air cylinder drive means having a movable piston rod extending from one end thereof,
means for pivotally connecting said piston rod to said diverter bar at a point intermediate the ends of said bar,
means for energizing said piston rod to move said diverter arm from a non-obstructing position aligned with said main conveyor to a diverting position aligned with said side conveyor, and
means for pivotally mounting said air cylinder on said main conveyor to allow said cylinder to swing when said cylinder is energized.
2. Article diverting apparatus, comprising:
a main conveyor for conveying said article in one direction,
a side conveyor joining said main conveyor and extending therefrom to define an alternate path for said article,
a diverter bar positioned above said main conveyor across from said side conveyor, said diverter bar having a plurality of roller bearings mounted along the inside edge of said bar for engaging said article to be diverted, means for pivotally mounting one end of said bar on the outside of said main conveyor for movement in a plane parallel to the plane of said conveyors, an air cylinder having a movable piston rod extending from one end thereof, means for pivotally connecting said piston rod to said diverter bar at a point intermediate the ends of said bar, means for actuating said piston rod to move said diverter arm from a non-obstructing position aligned with said main conveyor to a diverting position aligned with said side conveyor, means for pivotally mounting said air cylinder to allow said cylinder to swing in said plane when said piston rod is actuated, said pivotal mounting means including a U-shaped frame member fastened to the outside of said main conveyor, an axle extending vertically through said frame member and having a mounting clamp at the upper end of said axle conected to one of of said cylinder, and an angular bracket supporting the other end of said cylinder and extending below said frame member to pivot about the lower end of said axle.

References Cited by the Examiner

UNITED STATES PATENTS

| | | | |
|---|---|---|---|
| 1,763,809 | 6/1930 | Murphy | 198—38 X |
| 1,868,894 | 7/1932 | Glahn | 198—38 X |
| 2,219,055 | 10/1940 | Pereslegin | 198—28 |
| 3,045,792 | 7/1962 | Greller | 193—36 |

OTHER REFERENCES

"How To Get Packages Off Conveyors," an article from "Modern Materials Handling" magazine; April 1960, pages 97–100.

SAMUEL F. COLEMAN, *Primary Examiner.*

WILLIAM B. LABORDE, *Examiner.*